June 23, 1959  I. KUNTZ ET AL  2,891,595
CHLORINATED RUBBERY COPOLYMERS
Filed July 31, 1956
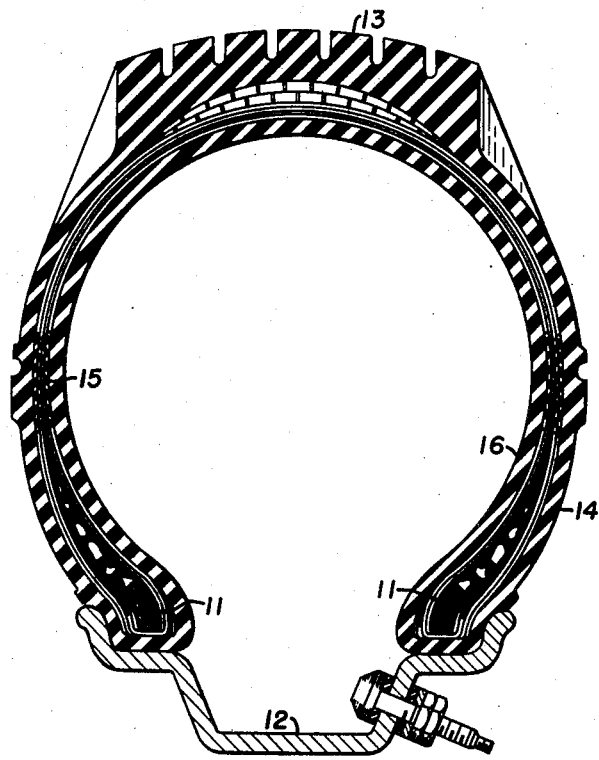
FIG. I
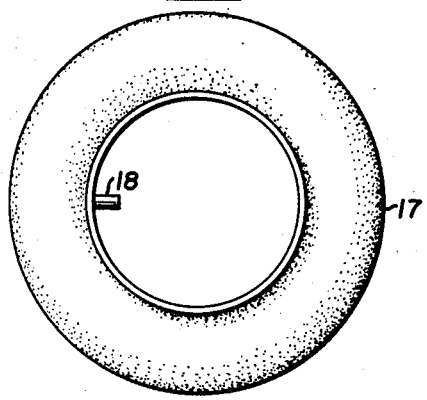
FIG. 2
Irving Kuntz
Elroy J. Inchalik      Inventors
Theodore Lemiszka
   By  W. H. Smyers   Attorney June 23, 1959  I. KUNTZ ET AL  2,891,595
CHLORINATED RUBBERY COPOLYMERS
Filed July 31, 1956  2 Sheets-Sheet 2

Irving Kuntz
Elroy J. Inchalik    Inventors
Theodore Lemiszka
By  *W. H. Smyers*    Attorney

United States Patent Office 2,891,595
Patented June 23, 1959

2,891,595

CHLORINATED RUBBERY COPOLYMERS

Irving Kuntz, Roselle Park, Elroy J. Inchalik, Metuchen, and Theodore P. Lemiszka, Rahway, N.J., assignors to Esso Research and Engineering Company, a corporation of Delaware Application July 31, 1956, Serial No. 601,237

22 Claims. (Cl. 152—330)

This invention relates to novel rubber reaction products and to methods of preparing and using the same. More particularly, the present invention relates to reaction products of isoolefin-multiolefin rubbery copolymers, particularly Butyl rubber, with a minor proportion of chlorine or chlorine-containing compounds; said reaction products being further modified by reaction with aluminum alcoholates. The chlorinated rubbery copolymers suitable for use in accordance with the present invention generally contain a major proportion, preferably at least 85 weight percent, of isoolefins and a minor proportion, preferably not more than about 15 weight percent of multiolefins.

Butyl rubber, which comprises the low unsaturation copolymerization product of a major proportion of an isoolefin of about 4 to 8 carbon atoms and a minor proportion of a multiolefin of about 4 to 14 carbon atoms, has been available commercially for a number of years and has found utility in the manufacture of certain products such as automobile inner tubes, electrical insulation, tire curing bags or bladders and the like. In most respects, Butyl rubber is superior to natural rubber or any of the high unsaturation synthetic rubbers such as diene-styrene rubber, diene-nitrile rubber, polychloroprene rubber, etc., which have an unsaturation in the order of about 300 to 400 Iodine No. (Wijs). This is because isoolefin-multiolefin type rubbery copolymers, particularly Butyl rubber, both before and after vulcanization, are more resistant to oxidation and attack by chemical agents than the above-mentioned highly unsaturated rubbery materials.

However, Butyl rubber, and other more unsaturated isoolefin-multiolefin copolymers, have not exhibited quite as high tensile strengths or tensile modulus as other synthetic rubbers and have not been covulcanizable with other common rubbery copolymers such as GR–S rubber, Buna–N rubber, natural rubber, etc. It is therefore very desirable to have available a Butyl-type rubber or other rubbery copolymers of isoolefins and multiolefins having a combination of high tensile strength and high modulus which are also covulcanizable with other unsaturated rubbery polymers. For instance, in the production of tires, it is desirable for certain layers therein, and especially for the carcass layer and for those layers exterior to the carcass, to have a combination of both high tensile strength and high modulus.

It has recently been found that isoolefin-multiolefin copolymers may be rendered covulcanidable with other highly unsaturated rubbers such as GR–S rubber, Buna–N rubber, natural rubber, mixtures thereof, reclaimed mixtures thereof, etc., by a carefully controlled partial chlorination at temperatures above about 0° C. up to about 100° C. These chlorine-modified rubbery copolymers have utility for a wide variety of purposes and are superior in heat aging resistance to GR–S rubber, Buna–N rubber, natural rubber, ordinary Butyl rubber or brominated Butyl rubber. For the great majority of purposes, the tensile strength, modulus, and hysteresis characteristics of such a chlorinated Butyl rubber copolymer or other highly unsaturated chlorinated isoolifin-multiolefin copolymers are adequate.

However, it has now been found that such partially chlorinated isoolefin-multiolefin copolymers as those hereinbefore mentioned and certain other rubbery chlorinated polymers may be further improved as to tensile strength, modulus and such hysteresis characteristics as dynamic modulus, internal viscosity and relative damping by reacting with said chlorinated copolymers about 0.5 to 20.0 mols of an aluminum alcoholate per gram atom of chlorine present in the polymer before said reaction.

The invention will be best understood from the following description read in connection with the accompanying drawings, wherein:

Figure 1 is a vertical section of a pneumatic tubeless tire employing therein a modified copolymer in accordance with the present invention;

Figure 2 is a view in side elevation of a tire casing curing bag, formed of a material comprising a modified copolymer in accordance with the present invention;

Figure 3:
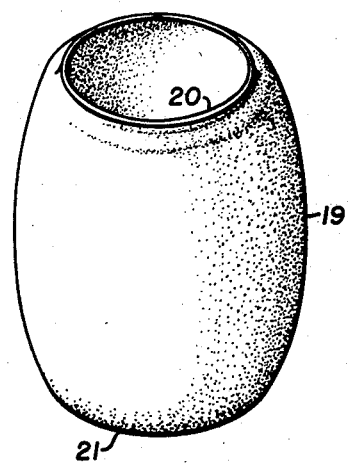
Figure 3 is a perspective view of a tire casing curing diaphragm or bladder as provided in the structure of a Bag-O-Matic press and containing therein a modified copolymer in accordance with the present invention.

Isoolefin-multiolefin copolymers of the above general type, especially where the copolymer contains about 85 to 99.5% (preferably about 95 to 99.5%) of a $C_4$ to $C_7$ isoolefin such as isobutylene with about 15 to 0.5% (preferably about 5 to 0.5) weight percent of a multiolefin of about 4 to 14, preferably about 4 to 8 carbon atoms are commonly referred to in patents and literature as "Butyl rubber" or GR–I rubber (Government Rubber-Isobutylene) and, for example, is referred to as "Butyl rubber" in patents and in textbook "Synthetic Rubber" by G. S. Whitby (1954 edition by John Wiley & Sons, Inc.), pages 608–609, etc. The expression "Butyl rubber" as employed in the specification and claims is intended to include copolymers containing about 90 to 99.5% by weight of an isoolefin of about 4 to 7 carbon atoms and about 10 to 0.5% of a conjugated multiolefin of about 4 to 10 carbon atoms. The preparation of Butyl type rubbers is described in U.S. Patent 2,356,128 to Thomas et al., in U.S. application, Serial No. 512,182, filed May 31, 1955, to Baldwin et al., and also in other patents as well as in literature. In general, the rubber comprises the reaction product of a $C_4$ to $C_7$ isoolefin (preferably isobutylene) with a $C_4$ to $C_{10}$ (preferably a $C_4$ to $C_6$) conjugated diolefin such as isoprene, butadiene, dimethyl butadiene, piperylene, etc. The substantially oxygen-free reaction product of isobutylene and isoprene is preferred.

As explained in copending application, Serial No.

512,182, heretofore it has not been possible to produce a Butyl rubber which is curable with certain basic metal compounds such as bivalent metal oxides (preferably zinc oxide) in the absence of sulfur without producing a rubber which does not withstand heat and aging and/or is degraded into a polymer of undesirably low molecular weight. It has also not been possible to produce heat stable Butyl rubbers (which are not degraded as to molecular weight) which are covulcanizable with or without added sulfur with certain highly unsaturated rubbers such as natural rubber and synthetic rubbers such as GR-S rubber, Buna-N rubber, neoprene rubber, etc.

As disclosed in copending application, U.S. Serial No. 512,182, it is now possible to produce Butyl rubbers which are vulcanizable with basic metal compounds and covulcanizable with more highly unsaturated rubbers by chlorinating the Butyl rubber in a manner which does not degrade the molecular weight thereof, but sufficiently to produce a rubber which when vulcanized retains its tensile strength upon heat aging. Such chlorinated Butyl rubbers are substantially free of combined oxygen and are readily covulcanizable with more highly unsaturated rubbers with or without added sulfur to produce rubbery products of excellent heat aging resistance. The chlorinated Butyl rubbers so formed do not greatly differ in curing rate as compared to natural rubber and synthetic rubbers such as GR-S rubber and thus, as pointed out above, may be covulcanized therewith by the use of zinc oxide and/or sulfur. The chlorinated Butyl rubber may also be employed in the form of a latex which is an emulsion of the rubber in water.

By the processes disclosed and claimed in copending application, Serial No. 512,182, rubbery materials of the type of Butyl rubber are chlorinated so as to contain about at least 0.5 weight percent (preferably at least about 1.0 weight percent) combined chlorine but not more than about "X" combined chlorine, wherein:

$$X = \frac{35.46L}{(100-L)M_1 + L(M_2+35.46)} \times 100$$

and

L = mole percent of the multiolefin in the polymer
$M_1$ = molecular weight of the isoolefin
$M_2$ = molecular weight of the multiolefin
35.46 = atomic weight of chlorine Restated, there should be at least about 0.5 weight percent of combined chlorine in the polymer but not more than about one atom of chlorine combined in the polymer per molecule of multiolefin present therein; i.e., not more than about one atom of combined chlorine per double bond in the polymer.

Suitable chlorinating agents which may be employed are gaseous chlorine, alkali metal hypochlorites (preferably sodium hypochlorite) alkyl hypochlorites (preferably $C_4$ to $C_{10}$ tertiary alkyl hypochlorites), sulfur chlorides (particularly oxygenated sulfur chlorides), pyridinium chloride perchloride, N-chlorosuccinimide, alpha-chloroacetoacetanilide, trichlorophenol chloride, N-chloroacetamide, beta-chloro-methyl phthalimide, and other common chlorinating agents. The preferred chlorinating agents are gaseous chlorine and sulfuryl chloride.

The chlorination is generally conducted at above about 0° to about +100° C., advantageously at above about 0° to 65° C., preferably at about 20° to 50° C. (room temperature being satisfactory), depending upon the particular chlorinating agent, for about one minute to several hours. An advantageous pressure range is from about 0.5 to 400 p.s.i.a.; atmospheric pressure being satisfactory. The chlorination conditions are regulated to chlorinate the rubbery copolymer to the extent above mentioned. For example, if the Butyl rubber is GR-I-18 rubber, it is preferably chlorinated to contain about 0.5 to 2.5%, advantageously about 1 to 2%, preferably about 1.2 to 1.8% combined chlorine.

The chlorination may be accomplished in various ways. One process comprises preparing a solution of the copolymer as above, in a suitable inert liquid organic solvent such as a $C_3$ to $C_8$ or preferably a $C_5$ to $C_7$ inert hydrocarbon or halogenated derivatives of saturated hydrocarbons, examples of which are hexane, heptane, pentane, branched chain paraffins, naphtha, kerosene, straight run mineral spirits, cyclohexane, cyclopentane, alkyl substituted cycloparaffins, benzene, toluene, chlorobenzene, chloroform, trichloroethane, carbon tetrachloride, mixtures thereof, etc., and adding thereto gaseous chlorine or other chlorinating agent, which may optionally be in solution, such as dissolved in an inert hydrocarbon, an alkyl chloride, carbon tetrachloride, etc.

The concentration of the Butyl rubber in the solvent will depend upon the type of reactor, molecular weight of the Butyl rubber, etc. In general, the concentration of a Butyl rubber having a viscosity average molecular weight of about 200,000 to about 400,000, if the solvent is a substantially inert hydrocarbon, will be between 1 and 30% by weight, preferably about 5 to 20%. If chlorine gas is employed to chlorinate such a rubbery solution, it may also be diluted with up to about 5 times its volume, preferably about 0.1 to 2.0 times its volume of an inert gas such as nitrogen, methane, ethane, carbon dioxide, etc.

The resulting chlorinated Butyl rubber polymer may be recovered in various manners. The polymer may be precipitated with acetone or any other known non-solvent for the rubber and dried under about 1 to 760 millimeters or higher of mercury pressure absolute at above about 0° to 180° C., preferably about 50° to 150° C. (e.g. 70° C.). Other methods of recovering the chlorinated Butyl rubber polymer from the hydrocarbon solution of the same are by conventional spray or drum drying techniques. Alternatively the chlorinated Butyl rubber containing solution may be injected into a vessel containing steam and/or agitated water heater to a temperature sufficient to flash off the hydrocarbon solvent and form an aqueous slurry of the chlorinated Butyl rubber. The chlorinated Butyl rubber may then be separated from this slurry by filtration, dried and recovered as a "crumb" or as a dense sheet or slab by conventional milling and/or extruding procedures.

The chlorinated copolymer formed advantageously has a viscosity average molecular weight between about 250,000 and 2,000,000 and a mole percent unsaturation between about 0.5 to 10.0, preferably 0.6 to 5.0. This copolymer, when cured, has a good elastic limit, tensile strength, abrasion resistance and flexure resistance and may be employed as an inner lining, tie-ply, tread or sidewall in tires; in the manufacture of curing bags and diaphragms, conveyor belting, etc.

Other copolymers suitably chlorinated and modified by reaction with aluminum alcoholates in accordance with the present invention include copolymers of 4-methyl pentene-1, 2-ethyl butene-1, 4-ethyl pentene-1 or the like, as well as isobutylene, 2-methyl butene-1 or 3-methyl butene-1 with the following multiolefins:

(1) Acyclic or open-chain conjugated diolefins such as 3-methyl pentadiene-1,3; conjugated hexadienes; 2-neopentylbutadiene-1,3 and the like;

(2) Alicyclic diolefins, both conjugated and non-conjugated such as 1-vinyl cyclohexene-3; 1-vinyl cyclobutene-2; cyclopentadiene; dicyclopentadiene; diolefinic terpenes such as dipentene, terpinenes, terpinoline, phellandrenes, sylvestrene and the like;

(3) Acyclic triolefins such as 2,6-dimethyl-4-methyleneheptadiene-2,5; 2-methyl hexatriene-1,3,5 and other conjugated triolefins such as ocymene or allo-ocymene;

(4) Alicyclic triolefins such as fulvene; 6,6-dimethyl fulvene; 6-phenyl fulvene; tertiary alkyl fulvenes; 1,3,3-trimethyl-6-vinyl cyclohexadiene-2,4; cycloheptatriene; etc.; and (5) Higher multiolefins such as 6,6-vinyl methyl fulvene (as tetraolefin) and 6,6-diisopropenyl fulvene (a pentaolefin).

It is also within the purview of the present invention to react with aluminum alcoholates chlorinated tripolymers of isoolefins, multiolefins and a third or even a fourth monoolefinic compound containing an aromatic nucleus such as styrene, alpha methyl styrene, p-methyl styrene, indene, dihydro-naphthalene, p-chlorostyrene, dichlorostyrene and mixtures thereof, etc. The amount of the monoolefinc compound employed is in a minor proportion based on total reacting monomers and is preferably employed in amounts such that between about 0.05 and 20.0 (e.g. about 0.5 to 5.0) weight percent of the monooelefinic aromatic compound is combined in the resulting copolymer. A particularly advantageous isoolefin-multiolefin containing copolymer of this last mentioned type, which is suitably partially chlorinated and reacted with aluminum alcoholates in accordance with the present invention, comprises the copolymerization product of about 95 to 99 parts by weight of a $C_4$ to $C_6$ isoolefin and about 1 to 5 parts by weight of a $C_4$ to $C_6$ multiolefin with about 0 to 3 parts by weight of such vinyl aromatic compounds as hereinbeforementioned.

In preparing Butyl rubber, a low molecular weight isoolefin, such as 2-methyl-butene-1 or preferably isobutylene, may be copolymerized with a multiolefin such as a conjugated diolefin, preferably isoprene, at relatively low temperatures; generally from about 0° C. to about —200° C. or lower; an advantageous range being from about —40° C. to about —180° C., preferably from about —80° C. to —160° C. The copolymerization is advantageously conducted in the presence of a Friedel-Crafts catalyst such as aluminum chloride, titanium tetrachloride, boron trifluoride, uranium chloride, aluminum ethoxy-chloride, etc., preferably dissolved in an alkyl halide such as ethyl or methyl chloride, or dissolved in carbon disulfide or an equivalent solvent.

One particularly advantageous Butyl rubber desirably chlorinated and reacted with aluminum alcoholates in accordance with the present invention is produced with the preferred reactants being about 0.5 to 5.0 parts by weight of isoprene and about 95.0 to 99.5 parts by weight of isobutylene. The mixture of these reactants is cooled to a temperature within the range of about —50° C. to —150° C. and then polymerized by the addition thereto of a catalyst solution of an aluminum halide, such as aluminum chloride dissolved in methyl chloride. The resulting copolymer preferably has an iodine number (Wijs) between about 0–50 (preferably about 1–20) and a Staudinger molecular weight between about 20,000 and 200,000 and even more especially between about 30,000 and 150,000. When so prepared, the material is rubbery in nature and has the property of being curable with sulfur especially in the presence of bivalent metal oxides such as zinc oxide and/or in the presence of organic sulfides, particularly of the alkyl thiuram sulfide or thiocarbamate types.

Other suitable isoolefin-multiolefin copolymers other than Butyl rubber which are advantageously chemically modified in accordance with the present invention by reaction with chlorine (or chlorine-containing compounds) and with aluminum alcoholates, comprise copolymers prepared from feeds composed of about 50 to 1000 parts by weight of a $C_4$ to $C_{14}$ multiolefin such as a $C_4$ to $C_{10}$ conjugated diolefin with about 100 parts by weight of a $C_4$ to $C_8$ isoolefin such as isobutylene or 2-methyl butene-1. Such copolymers generally have iodine numbers between about 20 and 200 (Wijs), advantageously between about 30 and 100. Still another class of isoolefin-multiolefin copolymers comprises copolymerization products formed from feeds comprising about 100 to 500 parts by weight of a $C_4$ to $C_{14}$ multiolefin with about 100 parts by weight of a $C_4$ to $C_8$ isoolefin. These copolymers generally have iodine numbers (Wijs) between about 50 and 250, advantageously between about 100 and 200. It is also within the purview of the present invention to chemically modify with chlorine (or chlorine-containing compounds) and aluminum alcoholates, highly unsaturated copolymers which are tripolymers of isoolefins, multiolefins and monoolefinic compounds (preferably containing an aromatic nucleus) such as the vinyl aromatic compounds hereinbeforementioned.

The present invention also contemplates new and useful cements including such rubbery isoolefin-multiolefin containing copolymers as described above which have been modified by chlorine and aluminum alcoholates in accordance with the invention. For instance, a single cement may be employed to bond Butyl rubber to metal whereas double cements are advantageously employed as tie gums to bond together unlike rubbery plastic, or elastic materials. These new double cements or tie gums are especially useful for bonding together layers or portions of natural rubber or other highly unsaturated synthetic rubbers to low unsaturation isoolefin-multiolefin interpolymers such as Butyl rubber.

The foregoing cements are prepared by Friedel-Crafts catalysis of a $C_4$ to $C_8$ isoolefin, such as isobutylene with a $C_4$ to $C_{14}$ multiolefin at temperatures between about 0° and —200° C. The cement for application to the low unsaturation rubbery material is prepared from a feed composed of a $C_4$ to $C_{14}$ isoolefin and a $C_4$ to $C_{14}$ conjugated diolefin having a ratio of about 2 to 100 parts by weight of diolefin per 100 parts by weight of isoolefin. The unsaturation of the resulting copolymer generally corresponds to an iodine number of about 30 (Wijs) up to about 200. The copolymer formed is then reacted with chlorine (or a chlorine-containing compound) and with an aluminum alcoholate in accordance with the invention. The modified copolymer formed is advantageously emulsified in water to form a latex and/or is diluted with about 20 to 95%, preferably about 40 to 90% of a polymer solvent such as hexane, heptane, benzene, naphtha, straight run mineral spirits, mixtures thereof, etc.

The polymer component of the cement for application to the highly unsaturated rubbery polymer is preferably copolymerized by Friedel-Crafts catalysis at temperatures between about 0% and —200° C., from feed mixtures having about 100 to 800 parts by weight of a $C_4$ to $C_{10}$ multiolefin per 100 parts by weight of a $C_4$ to $C_7$ isoolefin such as isobutylene and/or 3-methyl butene-1. The copolymer formed generally has an unsaturation corresponding to an iodine number (Wijs) of at least about 50 up to about 300, preferably about 100 to about 225. This polymer is then likewise reacted with chlorine (or a chlorine-containing compound) and with an aluminum alcoholate in accordance with the invention and solvated in any of the foregoing Butyl rubber type polymer solvents, with or without subsequent emulsification with water into a latex in a colloid mill or sonic mixer such as a Rapisonic Homogenizer, etc.

To each of the foregoing cements are then preferably added per 100 parts by weight of copolymer, about 2 to 30 parts by weight of zinc oxide, about 20 to 100 parts by weight of a carbon black such as a channel black, furnace black or thermal black (or an admixture of carbon black with a hydrated silica such as Hi-Sil 2202), about 0 to 10.0 parts by weight of sulfur, about 0 to 5.0 parts by weight of an ultra-accelerator such as tetramethyl thiuram disulfide (and/or tellurium diethyl dithiocarbamate) and alternatively, about 0 to 10 parts of a quinone dioxime such as p,p'-dibenzoquinone and/or p-quinone dioxime. The double cements may have a different number or different types of fillers and vulcanization ingredients and may include minor proportions of phenolic aldehyde resins, hydrocarbon plasticizer oils, esters, tars, waxes, etc., without exceeding the scope of the invention. For use in tie-plies, the amount of curatives such as sulfur, accelerators, etc. is advantageously reduced or may even be eliminated.

In employing the foregoing double cements in accordance with the invention, the cements are coated on the rubbery surfaces as hereinbefore mentioned, the cements then being permitted to partially dry at temperatures between 20° and 100° C. for times between about 5 and 100 minutes. The two rubber surfaces thus coated with the respective cements are then placed face to face with their cemented surfaces touching, compressed under a pressure in the range of between about 0 and 5000 p.s.i.g., preferably between about 40 and 2000 p.s.i.g., and vulcanized for times of about 2 minutes to 10 hours at temperatures between about 250 and 350° F.

When coating metal surfaces including sheet metal, wire, tubing, etc., the only cement applied is the cement normally coated on the low unsaturation rubber. This cement as mentioned above, is normally prepared from a feed composed of about 2 to 100 parts by weight of a $C_4$ to $C_{14}$ multiolefin and about 100 parts by weight of a $C_4$ to $C_7$ isoolefin, the copolymer product formed having been subsequently partially chlorinated and reacted with aluminum alcoholates in accordance with the present invention. This cement preferably contains curatives but may be likewise diluted with solvents and/or extended with fillers, tackifiers, viscous oils, etc. Alternatively, the copolymer, without an added solvent, may be calendered in a hot viscous state directly on to the metal to be rubber-coated or the compounded rubber may be applied to the metal in the form of a latex.

In practicing the present invention, an isoolefin-multiolefin-containing copolymer, preferably Butyl rubber, is chlorinated so as to contain not more than about 1 atom of chlorine per double bond in the copolymer and the resulting chlorinated rubber is then reacted with about 0.05 to 20, advantageously between about 0.1 to 10, preferably about 0.2 to 3.0 moles of an aluminum alcoholate per gram atom of chlorine in the polymer, at a temperature between above about 0° to about 250° C., advantageously between about 10° to 150° C., preferably between about 20° to 100° C., for an inversely extended period of time depending upon the temperature of between about 5 minutes and 30 hours, preferably between about 0.5 and 10 hours with an aluminum alcoholate containing between about 2 and 24, advantageously between about 2 and 20, preferably between about 3 and 18 carbon atoms. The aluminum alcoholates found particularly effective for the purpose of the present invention comprise $C_2$ to $C_{18}$ aluminum alcoholates and mixtures of $C_2$ to $C_{18}$ aluminum alcoholates such as aluminum ethylate, aluminum propylates, aluminum butylates, aluminum amylates, aluminum hexylates, aluminum octylates, aluminum decylates, aluminum dodecylates, aluminum tridecylates, aluminum octadecylates, and mixtures thereof.

If the isoolefin-multiolefin type copolymer is Butyl rubber, the resulting aluminum alcoholate-modified-chlorinated Butyl rubber, prior to curing, may then be compounded with between about 0 to 20 weight percent, of an organic nitrogen-containing compound, preferably chosen from the following classes: polyfunctional nitrogen-containing organic compounds having one or more primary amino groups or two or more secondary amino groups, organic nitrogen-containing compounds which, under vulcanization conditions, form in situ the foregoing amino groups by isomerization, decomposition, reduction or disproportionation, and/or compounds whose chemical resonance forms involve contributions from mesomers with the foregoing amino groups, mixtures thereof, etc.

To the above composition, about 0 to 50 weight percent, advantageously about 1 to 30 weight percent, preferably about 2 to 30 weight percent of a basic metal compound such as zinc oxide, magnesium oxide, calcium oxide, lead oxides, (or basic metallo-organic compounds such as basic lead stearate, etc., may then be added.

In the vulcanization of aluminum alcoholate-modified-chlorinated Butyl rubber, 100 parts by weight of aluminum alcoholate-modified-chlorinated butyl rubber are advantageously compounded into the following:

| Component | Typical Range in Parts by Weight |
| --- | --- |
| Aluminum-alcoholate-modified chlorinated Butyl rubber | 100 |
| Tackifier (e.g. phenol-formaldehyde resin) | 0–20 |
| Carbon Black (e.g. MPC black) | 5–100 |
| Hydrated Silica (e.g. Hi-Sil-202) [1] | 0–100 |
| Plasticizer Oil [2] | 0–30 |
| Antioxidant (e.g. heptylated diphenyl amine) | 0–1.5 |
| Sulfur | 0–10.0 |
| Accelerator (e.g. benzothiazyl disulfide) | 0–2.0 |
| Ultra accelerator (e.g. tetramethyl thiuram disulfide) | 0–3.0 |
| Organic nitrogen-containing compound (e.g. hexamethylene tetramine) | 0–5.0 |
| Basic metal compound (e.g. zinc oxide) | 2.0–30.0 |

[1] Hi-Sil-202 is a pigment of very fine particle size of precipitated hydrated silica having the following properties listed:

| Property | Value |
| --- | --- |
| Bulk Density (lbs. per cubic foot) | 8.0 |
| Specific Gravity | 1.95 |
| Average Particle Size (millimicrons) | 22 |
| Moisture (5) | 5 |
| pH | 7.5 |
| Refractive Index | 1.46 |
| Ignition Loss (percent max.) | 10 |
| $SiO_2$ (percent) | 84 |
| CaO (percent) | 1.0 |
| NaCl (percent, max.) | 1.0 |
| $Fe_2O_3$ (percent, max.) | 0.3 |
| $Al_2O_3$ (percent, max.) | 4.0 |

[2] The plasticizer oil is preferably a hydrocarbon oil derived from a paraffinic or naphthenic base crude having the following characteristics:

| Property | General Range |
| --- | --- |
| Specific Gravity | 0.85–0.97 |
| Flash point, ° F. (open cup method) | 400–550 |
| Viscosity, SSU: | |
| @ 100° F | 300–1,000 |
| @ 210° F | 30–200 |
| Iodine Number (cg./g.) | 0–30 |

The uncured aluminum alcoholate-modified-chlorinated Butyl rubber may also be blended with about 1 to 10%, preferably 2 to 4% of a stabilizer such as a group II metal silicate, particularly calcium silicate, and/or with about 1 to 5%, preferably 2 to 4% of an absorbent deactivator such as various high boiling polar compounds, e.g. ethylene glycol, during or preferably before the rubber is compounded with the carbon black and/or hydrated silica and curatives.

The amount of hydrated silica added, per 100 parts by weight of aluminum alcoholate-modified-chlorinated Butyl rubber is advantageously about 5–50, preferably about 20–40 parts for tie-ply compositions, and somewhat higher, say about 20–100, preferably about 30–75 parts for compositions suitable for inner linings of tires. The amount of hydrated silica may be partially or totally replaced with carbon black, preferably a thermal black or furnace black for inner lining compositions or a channel black, thermal black, or furnace black for tie-ply compositions.

Vulcanization of such compositions as the foregoing, when used in the tie-plies is generally for about 10 to 100 minutes at about 250° to about 380° F. For a similar curative system, the curing time for an inner lining will be for substantially shorter periods of time at higher temperatures (e.g. up to about 50° F. higher) as compared to that required for tie-plies.

A light-colored vulcanizate would include the following or its equivalent.

| Component | Parts by Weight |
|---|---|
| Aluminum alcoholate-modified-chlorinated Butyl rubber | 100 |
| Nitrogen-containing organic compound (e.g. diethylene triamine) | 0–15.0 |
| $TiO_2$ | 10–75 |
| ZnO | 2–30 |
| MgO | 0–30 |
| CaO | 0–20 |
| Bluing Agent (Ultramarine Blue) | 0–2.0 |
| Stearic Acid | 0–2.0 |
| Sulfur | 0–5.0 |
| Accelerator (e.g. Mercaptobenzothiazole) | 0–3.0 |
| Ultra Accelerator (e.g. tellurium diethyl dithiocarbamate) | 0–3.0 |
| Antioxidant (e.g. ditertiary butyl-p-cresol) | 0–2.0 |
| Phthalate ester plasticizer | 0–20.0 |

Suitable pigments, when employed in minor quantities in pastel aluminum alcoholate-modified-chlorinated Butyl rubber composites, are as follows: calcium carbonate; ferric hydroxide; chrome-yellow; Prussian blue, phthalocyanine, etc. Conventional non-staining antioxidants, or even a slightly colored antioxidant such as phenyl beta naphthalamine, may be employed. However, the non-staining antioxidants which are particularly efficacious for white Butyl vulcanizates comprise about 0.1 to 2.0 weight percent, based on total rubbery polymer of either alkylated aromatic hydrocarbons or alkylated cresols such as 2,6-ditertiary butyl para cresol; bisphenols, such as bis (2-hydroxy-3-tertiary butyl-5-methyl phenyl) methane, amino phenols such as N-lauroyl p-amino phenol, or a $C_5$ to $C_9$ alkylated diphenylamine such as heptylated diphenylamine.

For dark colored vulcanizates about 100 parts by weight of the aluminum-alcoholate-modified-chlorinated Butyl rubber copolymer is advantageously compounded with about:

| Component | Parts by Weight | |
|---|---|---|
| | General Range | Preferred Range |
| Carbon black (e.g., SRF black) | 0–150 | 25–75 |
| Zinc oxide | 2–50 | 3–30 |
| Magnesium oxide | 0–50 | 0–20 |
| Sulfur | 0–10 | 0–5 |
| Mold release agent (e.g., stearic acid) | 0–5 | 0–2 |
| Antioxidant (e.g. N-lauroyl p-amino phenol) | 0–5 | 0–2 |
| Organic nitrogen-containing compound (e.g., benzidine) | 0–15 | 0.5–15.0 |
| Ultra accelerator (e.g., tellurium (diethyl dithiocarbamate) | 0–3 | 0.5–2.0 |

For vulcanization purposes, as well as the above components, the aluminum alcoholate-modified-chlorinated copolymer before curing may be further compounded with various fillers such as clays, silica, titanium dioxide, etc., as well as with plasticizers which are preferably hydrocarbon plasticizer oils. Other plasticizers suitable in special instances are tars, waxes, resins, organic phosphates, etc.

Covulcanization of the aluminum alcoholate-modified-chlorinated Butyl rubber, according to the present invention, may be at temperatures from between about 200° F. to about 450° F., preferably at about 250° to 350° F. for from about several seconds up to about 5 days or more. Normally, the covulcanization is from about 10 minutes to about 20 hours at about 200° F. to about 0.5–20.0 minutes at about 400° F., depending upon the nature and amount of the added rubber covulcanized with the chlorinated Butyl rubber. For most uses, the optimum covulcanization conditions are from about 0.5 minutes to 5 hours at about 250° to 400° F., the higher the temperature the shorter the covulcanization time and vice versa.

In order to more fully illustrate the present invention, the following experimental data are given. The preparation of various chlorinated Butyl rubber copolymers was as follows:

CHLORINATED BUTYL RUBBER "A"

The Butyl rubber employed was a copolymer containing 97% isobutylene and 3% isoprene having a viscosity average molecular weight of 320,000. The reactants isobutylene and isoprene were mixed in a ratio of about 94 parts by weight of isobutylene and about 6 parts by weight of isoprene and were dissolved in liquid methyl chloride. To this admixture was added a solution of aluminum chloride dissolved in liquid methyl chloride in sufficient quantities to correspond to about 0.5 parts by weight of $AlCl_3$ per 100 parts by weight of reactants. The polymerization was then conducted at about −100° C., the solvent stripped off, the catalyst inactivated by water-washing, and the rubbery polymer recovered therefrom. The polymer was then dissolved in liquid ethyl chloride to form a 20% solution containing 100 parts by weight of copolymer. The copolymer was then admixed with 2.5 parts by weight of chlorine dissolved in liquid ethyl chloride and stirred for 2 hours under conditions of diffused light while keeping the ethyl chloride in the liquid state. The unreacted chlorine was neutralized with a 20% water solution of sodium carbonate. The rubbery chlorinated copolymer was recovered by filtration, was substantially free of combined oxygen, contained 1.25% by weight of chlorine and had a viscosity average molecular weight of 320,000.

CHLORINATED BUTYL RUBBER "B"

A polymer containing about 97% isobutylene and 3% isoprene as prepared above and having a viscosity average molecular weight of 320,000 was dissolved in hexane to form a 10% solution. To this polymer solution, 20 weight percent (based on the polymer) of liquid sulfuryl chloride was added as the chlorinating agent and the resulting chlorinated interpolymer was precipitated with acetone, collected, and redissolved in hexane three times and ultimately dried and analyzed and found to have a viscosity average molecular weight of 320,000 and to contain 1.4% chlorine based on the polymer.

CHLORINATED BUTYL RUBBER "C"

Thirty grams of an interpolymer containing about 98.0% isobutylene and 2.0% isoprene having a viscosity average molecular weight of 330,000 were dissolved in 480 grams of carbon tetrachloride and treated for 2 hours at room temperature with 3 milliliters of liquid sulfuryl chloride containing 10.5 weight percent chlorine based on the interpolymer. The polymer was then precipitated from solution with acetone, filtered, redissolved in n-hexane, again precipitated with acetone, redissolved and filtered, etc., in order to purify the product. The rubbery polymer was then dried and analyzed for chlorine content and found to contain 1.19% chlorine. When samples containing 100 parts by weight of the above chlorinated polymer were blended with 40 parts of carbon black, 5 parts of zinc oxide and 2 parts of stearic acid as a mold release agent and cured at a temperature of 300° F. for 80 minutes, the tensile strengths of the resulting vulcanizates were found to be in excess of 1500 p.s.i.

CHLORINATED BUTYL RUBBER "D"

A solution in carbon tetrachloride of a copolymer having a viscosity average molecular weight of 340,000 and containing 97.5% isobutylene and 2.5% isoprene was prepared to contain 100 grams of polymer per liter of solution. To this solution, at room temperature, under conditions of diffused light, 1.6 weight percent of chlorine was added in a solution of carbon tetrachloride having a concentration of 0.025 gram of chlorine per milliliter of solution. The chlorine was added in four equal increments. The first increment added imparted a yellowish shade of color to the polymer solution which faded out within a few minutes. Approximately 1 mole of hydrogen chloride was evolved per mole of chlorine added and the hydrogen chloride evolution began almost instantly. The last increment of chlorine added imparted a yellowish-green color to the polymer solution which likewise faded out. The composite was allowed to stand 2 hours at room temperature in diffused light and the substantially oxygen-free polymer was recovered from this solution by precipitation with methyl alcohol followed by drying in a vacuum oven for 12 hours at 50° C. and was found to contain 0.8 weight percent chlorine. Samples of the chlorinated polymer were then compounded with 40 parts by weight of carbon black, 2 parts by weight of stearic acid, and 5 parts by weight of zinc oxide per 100 parts by weight of the copolymer. They were heated for 60 minutes at 300° F. and were found to be completely vulcanized, having tensile strengths in excess of 1500 p.s.i.

CHLORINATED BUTYL RUBBER "E"

A solution in liquid ethyl chloride of a copolymer containing about 92 parts by weight of isobutylene and 8.0 parts by weight of isoprene having a viscosity average molecular weight of 240,000 is prepared in a concentration of 100 grams of polymer per liter of solution. To this solution at room temperature under conditions of diffused light, approximately 6.0 grams of chlorine as a solution of 0.03 gram of chlorine per milliliter of chloroform is added and the mixture is allowed to stand for one hour at room temperature. The polymer is recovered from the solution by precipitation with methyl alcohol, followed by drying in an oven overnight at 60° C. When 100 parts by weight of the resulting chlorinated polymer is compounded with 40 parts by weight of carbon black, 2 parts by weight of stearic acid and 5 parts by weight of zinc oxide and heated for one hour at 290° F., it is not degraded in viscosity and withstands heat aging at 300° F. for twenty hours satisfactorily. The amount of combined chlorine in the substantially oxygen-free chlorinated butyl rubber is about 3.0 weight percent.

CHLORINATED BUTYL RUBBERS "F" TO "M"

The same general procedure as for chlorinated Butyl rubber "E" is repeated by employing instead of the isobutyleneisoprene copolymer, the following:

(F) Copolymer containing about 95% isobutylene and 5% isoprene with 2.5% combined chlorine.

(G) Copolymer containing about 94% isobutylene and 6% cyclopentadiene with 2% combined chlorine.

(H) Copolymer containing about 92% isobutylene and 8% myrcene with 1.6% combined chlorine.

(I) Copolymer containing about 95% 2-methyl butene-1, 5% isoprene, with 1.3% combined chlorine.

(J) Copolymer containing about 96% 2-methyl butene-1, 4% butadiene-1,3, with 1.7% combined chlorine.

(K) Copolymer containing about 92% isobutylene, 8% butadiene-1,3, with 2.4% combined chlorine.

(L) Copolymer containing about 98% isobutylene and 2% 1-vinyl cyclohexene-1,3 with 0.5% combined chlorine.

(M) Copolymer containing about 85% isobutylene and 15% isoprene with 6% combined chlorine.

In each of the above cases, the chlorinated Butyl rubber is excellent in curing ability and heat aging resistance. The molecular weight of the copolymer is also not substantially degraded.

CHLORINATED BUTYL RUBBER "N"

Three additional runs were made chlorinating Butyl rubber. The Butyl rubber employed in all instances was a commercial Butyl rubber corresponding to GR–I–18 rubber. Such a rubber is produced by employing in the polymerization feed about 2.5 weight percent isoprene and about 97.5% isobutylene. The rubber had an eight minute Mooney viscosity at 212° F. of 71.0, a mole percent unsaturation of 1.47, and a viscosity average molecular weight of 420,000.

The chlorination of solutions of the above uncured Butyl rubber was conducted in a 50 gallon glass-lined Pfaudler reactor equipped with agitator and baffle.

The solvent for the Butyl rubber was as follows:

| Component | Volume Percent |
|---|---|
| 2,2-dimethyl butane | 0.1 |
| 2,3-dimethyl butane | 2.40 |
| 2-methyl pentane | 10.75 |
| 3-methyl pentane | 12.45 |
| n-hexane | 44.85 |
| methyl cyclopentane | 20.5 |
| 2,2-dimethyl pentane | 0.4 |
| benzene | 7.7 |
| cyclohexane | 0.85 |

Gaseous chlorine was continously added to the Butyl solutions (containing 10% polymer) over a period of 10 minutes at 30° C., and under atmospheric pressure. The chlorine was added to the reactor through a ⅜ inch stainless steel tube, one end of which was immersed below the liquid level of the agitated Butyl rubber solutions. The agitated solutions were then allowed to stand for an additional 50 minutes.

The resulting solutions of chlorinated Butyl rubber were then water-washed three times to remove dissolved hydrogen chloride. The solutions were then filtered to remove impurities as a precautionary measure.

The absolute amounts of Butyl rubber, solvent, and chlorine added as well as the calculated percent of added chlorine based on polymer and resulting percent of chlorine combined in the polymer were as follows:

| Run No. | lbs. of Butyl Rubber | Gallons of Solvent | Ounces of Chlorine | Percent Chlorine Added | Percent Chlorine combined in the Polymer |
|---|---|---|---|---|---|
| 1 | 25 | 30 | 12 | 3.0 | 1.49 |
| 2 | 29 | 35 | 14 | 3.0 | 1.47 |
| 3 [1] | 29 | 35 | 19 | 4.1 | 1.68 |

[1] The chlorination in Run No. 3 was accomplished employing as the Butyl rubber solvent 30 gallons of the above solvent and 5 gallons of the same solvent containing additionally about 1.2 volume percent of mixed $C_6$ olefins.

The resulting water-washed solutions containing the chlorinated rubbery Butyl products of runs 1, 2 and 3 were then mixed. The chlorinated Butyl rubber "N" was then recovered by injecting the dissolved chlorinated polymer into an agitated aqueous solution containing a commercial wetting agent of the aliphatic polyoxyethylene ether type (Sterox A.J.) in an amount of 64 cc. per 100 pounds of rubber as a dispersing aid. The solution also contained 1 pound of zinc stearate per 100 pounds of rubber and 0.2 pound of an antioxidant (2, 6-di-tertiary butyl para cresol); the hot agitated aqueous solution being employed in an amount of 500 gallons per 100 pounds of rubber.

The agitated solution was maintained at a temperature between about 160° and 170° F. whereby to flash off the hydrocarbon solvent and form an aqueous slurry of the chlorinated Butyl rubber in water. This slurry was then filtered and the chlorinated Butyl "N" which was in the form of a wet "crumb" was placed in a Proctor and Schwartz tray drier maintained at 210° F. and dried for 6 hours. The crumb depth on the tray was about ½ inch. The crumb was completely dried and compacted by milling for eight minutes on a conventional rubber mill having a roll temperature of 250° F.

One hundred parts by weight of the foregoing substantially oxygen-free dry chlorinated Butyl rubber crumb "N" was then compounded on a two-roll commercial rubber mill at a roll temperature of 100° F. with the following:

| Component | Parts by Weight |
|---|---|
| Zinc Oxide | 5 |
| Carbon black (SRF) | 50 |
| Stearic Acid | 1 |

Samples of the resulting compounded chlorinated Butyl rubber blend were then cured for inverse time periods (i.e., the shorter the time, the higher the temperature and vice versa) of 30, 45, 60, 75, and 90 minutes at temperatures of 287°, 294°, 300°, 307° and 320° F., in order to vulcanize the same. The following range of physical inspections were noted:

Tensile strength (p.s.i.) _____ 1550–2150
Modulus at 300% elongation (p.s.i.) _____ 1000–1280
Elongation at break (percent) _____ 300–595

Screening tests carried out using the individual chlorinated rubbers of chlorinated Butyl rubber "N" (runs 1–3) indicated substantially equal physical properties for each of the three individual chlorinated rubbers.

CHLORINATED BUTYL RUBBERS "O" TO "Q"

The same general procedure employed in the preparation of the samples of runs 1, 2 and 3 of Butyl rubber "N" was repeated except that the respective samples were recovered as chlorinated Butyl rubber portions "O," "P" and "Q" (corresponding to samples 1, 2 and 3 respectively) by precipitation with acetone and drying in an oven under vacuum at 70° C. The absolute amounts of Butyl rubber, hydrocarbon solvent and chlorine added as well as the calculated percent of added chlorine based on polymer and resulting percent of chlorine combined in the polymer were the same as for run Nos. 1, 2 and 3 of chlorinated Butyl rubber "N" as shown below:

| Chlorinated Butyl | lbs. of Butyl Rubber | Gallons of Solvent | Ounces of Chlorine | Percent Chlorine Added | Percent Chlorine combined in the Polymer |
|---|---|---|---|---|---|
| O | 25 | 30 | 12 | 3.0 | 1.49 |
| P | 29 | 35 | 14 | 3.0 | 1.47 |
| Q | 29 | 35 | 19 | 4.1 | 1.68 |

In each of the above cases, the chlorinated Butyl rubber was substantially free of oxygen and was satisfactory in curing ability, adhesion to natural rubber, compatability with natural rubber, GR–S rubber, neoprene rubber and Buna-N rubber. The heat aging characteristics were also satisfactory. The molecular weights of the copolymers were also not substantially degraded.

CHLORINATED BUTYL RUBBER "R"

The same general procedure employed in the preparation of chlorinated Butyl rubber "N" was repeated except that the solvent for the Butyl rubber to be chlorinated was benzene, the chlorination being by the same amount of gaseous chlorine but over a longer period of 30 minutes at the same temperature (30° C.) and pressure (atmospheric); the percent chlorine combined in the polymer being 1.22%. The resulting solution of polymer was then blended with 0.2 part by weight (per 100 parts by weight of polymer formed) of di-tertiary butyl para cresol as an antioxidant. The recovery procedure was the same as for chlorinated Butyl rubber "N".

The preparation of various aluminum alcoholates was as follows:

ALUMINUM ALCOHOLATE "A"

Fifty-four grams of aluminum turnings were dissolved in two liters of a mixture of anhydrous n-amyl alcohol and a petroleum distillate boiling within the range of from 300° to 400° F. The mixture of alcohol and petroleum distillate was in a ratio of one part of alcohol to one part of petroleum distillate, by volume. A small amount of mercuric chloride, namely 0.001 part by weight of mercuric chloride per part by weight of aluminum metal was added. To initiate the reaction, the mixture was heated until it boiled, after which the reaction proceeded to completion without further heating. There was obtained as the reaction mixture a solution of aluminum amylate.

ALUMINUM ALCOHOLATE "B"

Four hundred and thirty-two grams of aluminum turnings were dissolved in 16 liters of a 50–50 mixture of anhydrous n-amyl alcohol and a petroleum distillate boiling in the range of from 300° to 400° F. A small amount of mercuric chloride; i.e., 0.0005 part by weight of mercuric chloride per part by weight of aluminum, was used as the catalyst. To initiate the reaction, the mixture was heated until it boiled by means of a steam coil. After the reaction was well started, the reaction mixture was cooled slowly to room temperature. At this time, it was found that not all of the aluminum had reacted with the alcohol and the mixture was again heated to complete the reaction. Thirty minutes of visible total reaction were required. After this time, a solution of aluminum amylate was obtained.

ALUMINUM ALCOHOLATE "C"

A flask equipped with a stirrer, dropping funnel, and a water condenser was purged free of oxygen with nitrogen. Three hundred and ninety grams of octene-1 (99 mole percent pure) were then charged to the flask. One hundred and ninety-eight grams of aluminum tri-isobutyl were then slowly added from the dropping funnel, with agitation, to the octene-1. The reaction flask was then heated to 100–125° C., (i.e., 112° C.). The reaction was substantially complete when no further isobutylene was recovered in two Dry-Ice traps. Excess octene-1 was then removed by vacuum stripping. The intermediate product formed was essentially pure aluminum tri-octyl. A second flask equipped with a glass inlet tube, a dropping funnel, and a Dry Ice condenser was then purged free of oxygen with nitrogen gas. Fifty grams of the aluminum trioctyl which had been dissolved in 283 grams of n-heptane were added to the flask from the dropping funnel. Air was then introduced at a rate of 1 liter per minute at atmospheric pressure and oxidation carried out at 95° C. The oxidation was considered complete when the oxygen content of the effluent gas equaled that of the incoming air. The reaction mixture formed consisted essentially of aluminum octylate dissolved in n-heptane. It is to be understood that although the n-heptane was not stripped out by distillation, that this last-mentioned process step is contemplated as within the purview of the present invention.

ALUMINUM ALCOHOLATE "D"

This aluminum alcoholate, used in Example III (given hereinafter), was a commercially available aluminum isopropylate sold by Eastman Kodak under the designation P–4101.

ALUMINUM ALCOHOLATE "E"

A solution of fifty grams of triethyl aluminum dissolved in 283 grams of n-heptane was maintained under ethylene at a pressure of 650 to 900 (e.g. 775) p.s.i.g. for seven hours at temperatures of 100–110° C. The total pressure drop was 265 pounds. After venting, the reaction mixture was oxidized at atmospheric pressure and a temperature of 95° C., using air at a rate of 1 liter per minute. The oxidation was considered complete when the oxygen content of the effluent gas was equal to that of the incoming air. At this time, the oxidation was terminated and the oxidized reaction product, which was in the form of a solution which was distilled to remove lower boiling impurities, first at atmospheric pressure and then at reduced pressure (i.e. 4 mm.). Distillation at atmospheric pressure volatilized 286 grams up to a maximum pot temperature of 230° C. Distillation at a pressure of 4 millimeters and a maximum pot temperature of 238° C. volatilized an additional 22.3 grams. The aluminum alcoholate product remaining weighed 124 grams.

*Example I*

Chlorinated Butyl rubber "R" was reacted at room temperature with the aluminum trioctylate named as aluminum alcoholate "C"; the ratio between the chlorine in the chlorinated Butyl rubber "R" to the aluminum alcoholate "C" being 0.0344 gram atoms of chlorine to 0.0115 moles of aluminum trioctylate respectively. The chlorinated Butyl rubber "R" was in a 10% solution in hexane, the 0.0115 moles of aluminum trioctylate being dissolved in 200 ml. of n-heptane. The two solutions were mixed and heated at a temperature of 40–50° C., (i.e. 45° C.) for 4 hours and then allowed to stand overnight. The aluminum-alcoholate-modified chlorinated Butyl rubber product formed was recovered by the conventional multiple solution-precipitation technique hereinbefore described employing acetone as the antisolvent and n-hexane as the solvent for 3 times. The resulting precipitate was dried in a vacuum oven under 7 inches of mercury absolute for 7 hours at 60° C. The aluminum alcoholate-modified-chlorinated Butyl rubber product formed was then compared to the unmodified chlorinated Butyl rubber by curing each in the following compounded recipe:

| | Parts by weight |
|---|---|
| Rubber | 100 |
| Carbon black (SRF) | 50 |
| Zinc oxide | 5 |
| Sulfur | 2 |
| Tellurium diethyl dithiocarbamate | 1 |

The resulting compounded chlorinated Butyl rubber stocks formed were then cured for 60 minutes at 300° F. in order to vulcanize the same. The following inspections were noted:

| Property | Ordinary Chlorinated Butyl Rubber | Aluminum Alcoholate-Modified Chlor. Butyl Rubber |
|---|---|---|
| Tensile Strength (p.s.i.) | 1,700 | 2,120 |
| Modulus at 300% Elong. (p.s.i.) | 1,000 | 1,825 |
| Relative damping (percent) | 44 | 32 |
| Dynamic modulus (dynes/cm.²×10⁷) | 3.7 | 2.5 |
| Internal viscosity (poises×10⁶) | 1.43 | 0.64 |

The above data show that the aluminum alcoholate-modified chlorinated Butyl rubber exhibited a higher tensile strength and a much higher modulus compared to the unmodified chlorinated Butyl rubber. The aluminum alcoholate-modified chlorinated Butyl rubber vulcanizate had improved snap and drape (i.e. was more resilient) and superior hysteresis properties as demonstrated by its lower relative damping and much lower internal viscosity.

*Example II*

The same general procedure as in Example I was repeated except that MPC carbon black was substituted in both the modified and unmodified chlorinated butyl rubber stocks for the 50 parts by weight of SRF carbon black. The resulting compounded chlorinated butyl rubber stocks formed were then vulcanized for 60 minutes at 300° F., the following inspections being noted:

| Property | Ordinary Chlorinated Butyl Rubber | Aluminum Alcoholate-Mod. Butyl Rubber |
|---|---|---|
| Tensile strength (p.s.i.) | 2,050 | 2,140 |
| Modulus at 300% Elong. (p.s.i.) | 1,750 | 2,065 |
| Goodyear-Healy Pendulum Test (Rebound in percent) | 30.3 | 39.8 |

The above data show that the aluminum alcoholate-modified chlorinated Butyl rubber exhibited a higher tensile strength, rebound (or resiliency), and a much higher modulus compared to the unmodified chlorinated Butyl rubber. The snap and drape (i.e. resiliency) of the modified chlorinated Butyl rubber was superior to the unmodified specimen.

*Example III*

One hundred parts by weight of chlorinated Butyl rubber "R" were blended on a cold mill (room temperature) with 50 parts of SRF carbon black, 0.5 part of stearic acid as a processing aid, and 3.0 parts of aluminum isopropylate (hereinbefore referred to as Aluminum Alcoholate "D"). The mixture on the mill was then heated to 300° F., milled for 5 minutes, again cooled to room temperature, and compounded with 5 parts by weight of zinc oxide, 2 parts of sulfur, and 1 part of tellurium diethyl dithiocarbamate. The resulting compounded-aluminum-alcoholate-modified chlorinated Butyl rubber stock was then compared to a control stock by curing each stock for 45 minutes at 307° F. with the following physical inspections being noted:

| Property | Ordinary Chlorinated Butyl Rubber | Aluminum-Alcoholate-Modified Chlorinated Butyl Rubber |
|---|---|---|
| Tensile strength (p.s.i.) | 1,925 | 2,200 |
| Modulus at 300% Elong. (p.s.i.) | 1,050 | 1,300 |

The above data show that the aluminum alcoholate-modified chlorinated Butyl rubber exhibited a higher tensile strength and higher modulus compared to the unmodified chlorinated Butyl rubber.

One particularly advantageous use for the aluminum alcoholate-modified chlorinated isoolefin-multiolefin rubbery copolymers such as Butyl rubber of the present invention is in pneumatic tires of either the inner tube containing variety or in tubeless type tires.

Referring now to the drawings, Figure 1 depicts a pneumatic tubeless tire which comprises a hollow toroidal type member which is substantially U-shaped in cross-section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute bead portions 11—11 of the tire inside of which are a plurality of bead wires adhesively imbedded and molded in a rubber. The outer surface of the bead portion is advantageously formed into an air-sealing means such as a plurality of ribs to aid in adhesion to rim 12 when the tire is inflated. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to conventional fabrication, but in general, the tire is a multi-layered type of structure with an outer layer as above mentioned. The layer next adjacent the outer layer comprises a carcass 15, which includes a rubber having incorporated therein a fabric composed of a plurality of cotton, rayon, nylon or steel cords. The tire also includes an inner lining 16 advantageously made from rubber, e.g. aluminum alcoholate-modified-chlorinated Butyl rubber, in accordance with the invention, which has been at least partially vulcanized for an inversely extended period of time (i.e. the shorter the time the higher the temperature and vice versa) of about 1 to 100 mintues at about 100° to 400° F. The inner lining may also comprise any of the isoolefin-multiolefin-containing copolymers hereinbefore mentioned, containing, for example, about 85 to 99.5 parts by weight of an isoolefin, 0.5 to 15.0 parts by weight of a multiolefin, and about 0 to 10 parts by weight of an olefinic compound containing an aromatic nucleus. This inner lining must be substantially impermeable to air. The above multilayers, at least three in number, are conventionally bonded or otherwise adhered together, for example, by cementing and/or especially by vulcanizing to form a tire of a unitary structure.

The compositions of aluminum-alcoholate-modified-chlorinated Butyl rubber of the present invention may be employed generally throughout the tire. For example, as above-mentioned the inner lining 16 may comprise such a modified rubber. Alternatively, inner lining 16 may comprise ordinary Butyl rubber which has been bonded to carcass 15 by an interposed tie-ply of an aluminum alcoholate-modified-chlorinated isoolefin-multiolefin copolymer which has been at least partially vulcanized and preferably substantially completely vulcanized by bivalent metal oxides such as zinc oxide and/or sulfur and/or sulfur-containing compounds and/or polymethylol phenols and/or hydroxy-nitroso aromatic compounds and/or amino compounds and/or quinoid compounds such as paraquinone dioxime, its homologs or derivatives. Such an interposed tie-ply facilitates the inclusion of highly unsaturated rubbers such as natural rubber, GR-S rubber, Buna-N rubber, neoprene rubber, mixtures thereof, etc., in the carcass.

The other layers of the tire such as the carcass layer and/or the outer layer (including the tread area, sidewalls, outer bead portions, etc.) may also comprise aluminum alcoholate-modified isoolefin-multiolefin-containing copolymers, preferably chlorinated Butyl rubber, in accordance with the invention. Vulcanization of the carcass, plies (if any), sidewalls, and tread area is advantageously accomplished by heating the same for an inversely extended period of time (i.e. the longer the time the lower the temperature and vice versa) of about 1 to 200, advantageously 5 to 100, preferably 10 to 60 minutes at between about 250° to 450° F., preferably between about 275° and 400° F.

The tubeless tire may also contain, in at least the tread area 13, an oil-extended high molecular weight (e.g. viscosity average molecular weight of about 900,000 to about 2 million) Butyl rubber which has been bonded to either a highly saturated or unsaturated rubber or mixture of rubbers in carcass 15 by an interposed tie-ply of aluminum alcoholate-modified chlorinated Butyl rubber, in accordance with the invention, which has been advantageously substantially completely vulcanized.

Another advantageous use for the aluminum alcoholate-modified-chlorinated isoolefin-multiolefin-containing copolymers, particularly chlorinated Butyl rubber of the present invention is in the manufacture of curing bags, especially tire curing bags. Figure 2 of the accompanying drawings illustrates a tire curing bag made of such an aluminum-alcoholate-modified chlorinated isoolefin-multiolefin-containing copolymer, in accordance with the present invention, which has been advantageously compounded into the following recipe or its equivalent:

| Component | Parts by Weight | |
|---|---|---|
| | Typical Range | Preferred Range |
| Modified Chlorinated isoolefin-multiolefin Copolymer | 100 | 100 |
| Zinc oxide | 2-20 | 3-15 |
| Fillers [1] | 30-80 | 40-60 |
| Die anti-tack agent (e.g. stearic acid) | 0-5 | 0.5-2.0 |
| Phenolic resin | 0-20 | 2-15 |

[1] The filler advantageously comprises any suitable nonoxy carbon black such as furnace or thermal blacks and/or mineral fillers such as clays, talc, alumina, silica, diatomaceous earth, etc.

The above compounded stock is shaped into the form of curing bag 17 in accordance with the conventional practice and is then cured in a mold at temperatures between about 280° and 350° F. for a period of time ranging between about 10 minutes and 2 hours, the lower the temperature the longer the curing time and vice versa. Referring again to Figure 2, tire curing bag 17 is of an annular toroidal form having an external shape corresponding approximately to the interior contour of the pneumatic tire casing or inner liner to be cured thereon, and is equipped with the usual connecting valve 18 by means of which a heated fluid under pressure, such as hot water and/or steam is introduced into the interior cavity of the bag during the vulcanization of the tire. The tire curing bag is thereby expanded, causing the tire to conform closely to the surfaces of the mold cavity in which the tire is vulcanized. A tire curing bag generally has a wall thickness between about 0.5 to 1.5 inches. Such a curing bag, produced in accordance with the present invention, is superior to conventional curing bags in its resistance to deteriorating influences.

Another advantageous use for the aluminum alcoholate-modified-chlorinated isoolefin-multiolefin-containing rubbery copolymers of the present invention is in making tire casing curing diaphragms or bladders in Bag-O-Matic presses. Figure 3 shows such a hollow cylindrical curing bladder or diaphragm 19 useful in a Bag-O-Matic tire press. The top 20 and bottom 21 of the diaphragm are sealed when in position on the press by a combination of bead and clamping rings (not shown) which also form the bead area of the tire mold. A Bag-O-Matic tire press is illustrated and described on pages 314 and 318 to 319 in "Machinery and Equipment for Rubber and Plastics," volume I; "Primary Machinery and Equipment" (1952, compiled by R. G. Seaman and A. M. Merrill), to which reference may be had for further details.

The compounding of aluminum alcoholate-modified-chlorinated Butyl rubber for use in vulcanized curing diaphragms is essentially the same as for tire curing bags outlined above.

Other embodiments of the present invention comprise the use of aluminum alcoholate-modified-chlorinated isoolefin-multiolefin-containing copolymers, particularly chlorinated Butyl rubber, in conveyor belting and steam hose. The excellent heat-aging resistance properties of chlorinated isoolefin-multiolefin rubbery copolymers (which have superior heat-aging resistant properties compared to either the corresponding brominated or unhalogenated isoolefin-multiolefin-containing copolymers) makes the aluminum alcoholate-modified-chlorinated copolymers of the present invention particularly adaptable for use in steam hose and conveyor belting where, in each instance, the transport of hot material is involved.

Figure 4:
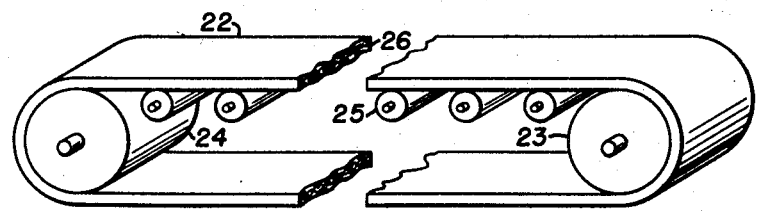
Figure 4 is a generally edgewise perspective view of a conveyor belt structure in which the belt is formed of a modified copolymer material in accordance with the present invention.

Figure 4 shows a conveyor belt 22 containing a chlorinated rubbery isoolefin-multiolefin-containing copolymer in accordance with the present invention, said belt being in position on drive roller 23, idle roller 24, and idle support rollers 25. The belt may consist wholly of a chlorinated isoolefin-multiolefin containing rubbery copolymer, particularly chlorinated Butyl rubber, in accordance with the present invention, but preferably contains imbedded therein a fabric 26 composed of a plurality of plies of cotton, rayon, nylon or steel filaments, cords or threads. A suitable formulation for compounding aluminum alcoholate-modified-chlorinated isoolefin-multiolefin-containing copolymers for use in either conveyor belting or in steam hose is as follows:

| Components | Parts by Weight | |
|---|---|---|
| | Typical Range | Preferred Range |
| Modified Chlorinated Isoolefin-multiolefin copolymer | 100 | 100 |
| Zinc oxide | 2-20 | 3-15 |
| Filler [1] | 40-120 | 50-80 |
| Die-anti-tack agent (e.g. stearic acid) | 0-5 | 0.5-2.0 |
| Phenolic resin | 0-20 | 2-15 |

[1] The filler may comprise oxy or non-oxy carbon blacks such as channel, furnace or thermal blacks and/or mineral fillers such as clays, talc, alumina, silica, silica-alumina, diatomaceous earth, etc.

Figure 5:
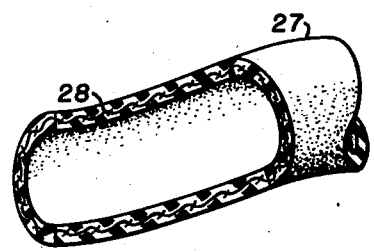
Figure 5 is a perspective view, partly in section, of a portion of a typical steam hose formed of a composition comprising a modified copolymer in accordance with the present invention.

Figure 5 shows a central longitudinal section broken away of a flexible rubber steam hose 27 produced in accordance with the present invention. Again, as in the case of the conveyor belt, the steam hose may consist wholly of aluminum alcoholate-modified-chlorinated Butyl rubber, but preferably contains imbedded therein a cotton, rayon, nylon, or steel fabric 28.

The expression "layer" as employed in the claims is intended to include plies and liners as well as such layers as the carcass, sidewalls, tread area, etc., of tires.

The compositions comprising aluminum alcoholate-modified-chlorinated isoolefin-multiolefin rubbery copolymers, particularly chlorinated Butyl rubber, in accordance with the present invention, may be employed for a wide variety of applications other than those mentioned hereinbefore, such as in electrical insulation, inner tubes, car window channel strips, proofed goods and other applications where Butyl rubber or certain chloroalkadiene rubbery homopolymers or copolymers have utility.

Resort may be had to various modifications and variations of the present invention without departing from the spirit or scope of the appended claims.

What is claimed is:

1. A composition comprising the reaction product of an isoolefin-multiolefin Butyl rubber copolymer produced by low temperature catalytic copolymerization and containing about 85 to 99.5% of a $C_4$ to $C_7$ isoolefin and about 15 to 0.5% of a $C_4$ to $C_{14}$ multiolefin with about 0.1 "X" to "X" weight percent of a chlorinating agent wherein $$"X" \text{ equals} \frac{35.46L}{(100-L)M_1+L(M_2+35.46)} \times 100$$

and $L$ = mole percent of the multiolefin in the copolymer,
$M_1$ = molecular weight of the isoolefin,
$M_2$ = molecular weight of the multiolefin, and
35.46 = atomic weight of chlorine, the resulting product formed having been reacted with between about 0.05 to 20.0 moles of an aluminum alcoholate per gram-atom of chlorine combined therein.

2. Composition according to claim 1 in which the aluminum alcoholate is aluminum ethylate.

3. Composition according to claim 1 in which the aluminum alcoholate is an aluminum isopropylate.

4. Composition according to claim 1 in which the aluminum alcoholate is an aluminum butylate.

5. Composition according to claim 1 in which the aluminum alcoholate is an aluminum amylate.

6. Composition according to claim 1 in which the aluminum alcoholate is an aluminum dodecylate.

7. A shaped article of manufacture adapted to resist injury at high temperature levels, said article containing therein the composition of claim 1.

8. A curing bag of an annular toroidal form adapted to retain therein a hot fluid, said bag being fabricated from the composition according to claim 1.

9. A tubeless rubber tire containing in at least one layer thereof the composition of claim 1.

10. A hollow cylindrical curing diaphragm fabricated from the composition according to claim 1.

11. A laminated conveyor belt fabricated from at least two rubber layers and at least one interposed layer of fabric, at least one of said rubber layers containing therein the composition of claim 1.

12. A hollow rubber hose suitable for conveying hot materials therethrough, said hose being fabricated from the composition of claim 1.

13. A composition comprising the reaction product of a Butyl rubber copolymer produced by low temperature catalytic copolymerization and containing about 85 to 99.5% of a $C_4$ to $C_{14}$ isoolefin and about 15 to 0.5% of a $C_4$ to $C_{14}$ multiolefin with a chlorinating agent, the chlorine-containing rubbery composition formed containing at least about 0.5 weight percent chlorine but not more than about 1 atom of chlorine per double bond in the copolymer and having been reacted with about 0.1 to 20.0 moles of a $C_2$ to $C_{24}$ aluminum alcoholate per gram atom of chlorine combined therein at temperatures between about 0° and 250° C.

14. In a tire adapted for use without an inner tube, the combination which comprises an open bellied body terminating in spaced bead portions having an inner lining of a Butyl rubber copolymer produced by low temperature catalytic copolymerization and containing about 85 to 99.5% of a $C_4$ to $C_7$ isoolefin and about 15 to 0.5% of a $C_4$ to $C_{14}$ multiolefin; said copolymer having been modified so as to contain at least about 0.5 weight percent chlorine but not more than about one combined atom of chlorine per double bond in the Butyl rubber copolymer, said chlorine-containing copolymer having been reacted with between about 0.2 to 10.0 moles of an aluminum alcoholate per gram atom of chlorine combined therein, air sealing means at said bead portions, and a tread area intermediate of said bead portions; 100 parts by weight of the aluminum alcoholate-modified chlorinated Butyl rubber copolymer in the inner lining having been at least partially vulcanized in the presence of a composition comprising about 2-30 parts by weight of zinc oxide.

15. In a process for manufacturing a tubeless tire including a carcass member, the combination which comprises at least partially vulcanizing to said carcass member a layer disposed interiorly thereof, said layer comprising a rubbery copolymer containing about 85 to 99.5 weight percent of $C_4$ to $C_7$ isoolefin and about 0.5 to 15 weight percent of a $C_4$ to $C_{14}$ multiolefin and having been produced by low temperature catalytic copolymerization; said copolymer having been reacted with a member selected from the group consisting of chlorine and chlorine-containing compounds, and then with an aluminum alcoholate to improve the heat aging and vulcanizing characteristics of said copolymer, and vulcanizing to said carcass member a butyl rubber copolymer containing layer disposed exteriorly thereof; said last-named copolymer having been reacted so as to contain at least 0.5 weight percent chlorine but not more than about one combined atom of chlorine per double bond in the copolymer and with about 0.2 to 3.0 moles of a $C_2$ to $C_{20}$ aluminum alcoholate per gram atom of chlorine combined therein; said last named copolymer having been produced by low temperature catalytic copolymerization and containing about 85 to 99.5% of a $C_4$ to $C_7$ isoolefin and about 15 to 0.5% of a $C_4$ to $C_{14}$ multiolefin.

16. A composition comprising the reaction product of a chlorinated isoolefin-multiolefin Butyl rubber copolymer produced by low temperature catalytic copolymerization and containing about 85 to 99.5% of a $C_4$ to $C_7$ isoolefin and about 15 to 0.5% of a $C_4$ to $C_{14}$ conjugated diolefin with an aluminum alcoholate, said reaction product containing about 0.5 to 20 moles of said aluminum alcoholate per gram atom of chlorine in the copolymer.

17. A composition comprising the reaction product of an isoolefin-multiolefin Butyl rubber copolymer produced by low temperature catalytic copolymerization and containing about 85 to 95.5% of a $C_4$ to $C_7$ isoolefin and about 15 to 0.5% of a $C_4$ to $C_8$ conjugated diolefin with a chlorinating agent, said composition containing at least about 0.5 weight percent chlorine on a basis of the total weight of the copolymer, said copolymer containing not more than about one atom of chlorine per double bond and having been reacted with a minor proportion of an aluminum alcoholate.

18. A composition comprising the reaction product of a chlorinated isoolefin-multiolefin Butyl rubber copolymer produced by low temperature catalytic copolymerization and containing about 85 to 99.5% of a $C_4$ to $C_7$ isoolefin and about 15 to 0.5% of a $C_4$ to $C_{14}$ multiolefin, said reaction product containing about 0.5 to 20 moles of aluminum alcoholate per gram atom of chlorine present in the chlorinated copolymer, said reaction product having been at least partially vulcanized by heating at temperatures of between about 150 and 450° F. in the presence of a composition comprising about 2 to 30 parts by weight of zinc oxide.

19. A tire containing in at least one layer thereof the composition of claim 18.

20. A process for the preparation of an aluminum alcoholate modified chlorine-containing isoolefin-multiolefin Butyl rubber copolymer produced by low temperature catalytic copolymerization and containing about 85 to 99.5% of a $C_4$ to $C_7$ isoolefin and about 15 to 0.5% of a $C_4$ to $C_{14}$ multiolefin which comprises reacting at about 0° to 200° C. for an inversely extended period of time of between about 5 minutes and 20 hours said chlorine-containing copolymer with 0.1 to 20 moles of a $C_2$ to $C_{24}$ aluminum alcoholate per gram atom of chlorine combined in the copolymer, and recovering the aluminum alcoholate-modified-chlorinated isoolefin-multiolefin Butyl rubber copolymer formed from the reaction mixture.

21. Process according to claim 20 in which the reaction between the aluminum alcoholate and the chlorine-containing isoolefin-multiolefin containing copolymer is at a temperature between about 20° and 150° C. for an inversely extended period of time between about 30 minutes and 10 hours; said aluminum alcoholate being selected from the group consisting of $C_2$ to $C_{18}$ aluminum alcoholates and mixtures of $C_2$ to $C_{18}$ aluminum alcoholates.

22. An aluminum alcoholate modified chlorine-containing Butyl rubber tie ply composition comprising about 100 parts by weight of Butyl rubber containing at least about 0.5 weight percent chlorine but not more than about 1 combined atom of chlorine per double bond in the Butyl rubber copolymer, said copolymer having been produced by low temperature catalytic copolymerization and containing about 85 to 99.5% of a $C_4$ to $C_7$ isoolefin and about 15 to 0.5% of a $C_4$ to $C_{14}$ multiolefin; said copolymer having been reacted with between about 0.5 and 20 moles of an aluminum alcoholate per gram atom of chlorine combined therein and consequently compounded and cured with a composition comprising about 2 to 30 parts by weight of a basic metal oxide.

References Cited in the file of this patent

UNITED STATES PATENTS 2,732,354     Morrissey et al. _____ Jan. 24, 1956